United States Patent
Chivers et al.

(10) Patent No.: US 12,086,640 B2
(45) Date of Patent: Sep. 10, 2024

(54) URL (UNIFORM RESOURCE LOCATOR) SHORTENING SERVICE INCLUDING A CONTENT INTEGRITY CHECK

(71) Applicant: INTERNATIONAL BUSINESS MACHINES CORPORATION, Armonk, NY (US)

(72) Inventors: Matthew P Chivers, Waterlooville (GB); Michael John Coleman, Winchester (GB); Rebecca M. Quaggin-Mitchell, Botley (GB); David James Nice, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 17/807,786

(22) Filed: Jun. 20, 2022

(65) Prior Publication Data

US 2023/0409399 A1  Dec. 21, 2023

(51) Int. Cl.
*G06F 9/50* (2006.01)
*G06F 16/955* (2019.01)

(52) U.S. Cl.
CPC ............ *G06F 9/5033* (2013.01); *G06F 9/50* (2013.01); *G06F 16/9566* (2019.01)

(58) Field of Classification Search
CPC ............ H04L 41/0856; H04L 41/0816; H04L 41/0859; H04L 41/0813; G06F 9/5033
USPC ........................................................ 709/229
See application file for complete search history.

(56) References Cited

U.S. PATENT DOCUMENTS

| | | | |
|---|---|---|---|
| 10,067,920 B2 | 9/2018 | Teevan | |
| 11,303,670 B1* | 4/2022 | Wueest | ................. H04L 63/145 |
| 2004/0093347 A1 | 5/2004 | Dada | |
| 2006/0101069 A1 | 5/2006 | Bell | |
| 2007/0136279 A1 | 6/2007 | Zhou | |
| 2008/0147851 A1 | 6/2008 | Le | |
| 2009/0043774 A1* | 2/2009 | Sudhakar | ............ G06F 16/1873 |
| | | | 707/999.009 |
| 2014/0281919 A1 | 9/2014 | Giuliani | |
| 2015/0178347 A1 | 6/2015 | Mutalik | |

(Continued)

OTHER PUBLICATIONS

"Shortened URL Security", Information and Technology Services, Safe Computing, University of Michigan, Downloaded from the Internet on Feb. 17, 2022, 4 pgs., <https://safecomputing.umich.edu/be-aware/phishing-and-suspicious-email/shortened-url-security>.

(Continued)

*Primary Examiner* — David R Lazaro
*Assistant Examiner* — Mariegeorges A Henry
(74) *Attorney, Agent, or Firm* — Yee & Associates, P.C.

(57) ABSTRACT

A uniform resource identifier (URI) shortening service, such as a URL shortening service, creates the shortened URI along with "synopsis" data relating to the human understandable content of the resource, such as the text and images in a typical web site. Later, when users use the shortened URI to retrieve the resource, if the synopsis data for the resource has changed too much relative to the synopsis data as created at the earlier time of the URI shortening, then the requesting users are given some type of notification or warning that the content of the resource has changed. This can save the end users from wasting time retrieving and reviewing a resource that is no longer of interest due to the changes in the content.

20 Claims, 5 Drawing Sheets

(56) References Cited

U.S. PATENT DOCUMENTS

| | | |
|---|---|---|
| 2015/0205808 A1 | 7/2015 | Chakra |
| 2016/0043868 A1 | 2/2016 | Hoffmann |
| 2016/0234330 A1* | 8/2016 | Popowitz .............. H04L 67/565 |
| 2020/0057822 A1 | 2/2020 | Sow |

OTHER PUBLICATIONS

Markham, G., "Link Fingerprints", Version 0.6, Jul. 7, 2008, 4 pgs., <https://www.gerv.net/security/link-fingerprints/>.
Visualping, Downloaded from the Internet on Feb. 17, 2022, 8 pgs., <https://visualping.io/>.

* cited by examiner

URL (UNIFORM RESOURCE LOCATOR) SHORTENING SERVICE INCLUDING A CONTENT INTEGRITY CHECK

BACKGROUND

The present invention relates generally to the field of computer technology and particularly to using computer technology to shorten computer URL's (uniform resource locator).

The Wikipedia entry for "URL" (as of Feb. 17, 2022) states, in part, as follows: "A Uniform Resource Locator (URL), colloquially termed a web address, is a reference to a web resource that specifies its location on a computer network and a mechanism for retrieving it. A URL is a specific type of Uniform Resource Identifier (URI), although many people use the two terms interchangeably. URLs occur most commonly to reference web pages (http) but are also used for file transfer (ftp), email (mailto), database access (JDBC), and many other applications. Most web browsers display the URL of a web page above the page in an address bar. A typical URL could have the form http://www.example.com/index.html, which indicates a protocol (http), a hostname (www.example.com), and a file name (index.html)." (footnote(s) omitted) It is noted that the broader term uniform resource identifier (URI) may sometimes be used herein—this term includes, but is not limited to, URLs.

The Wikipedia entry for "URL shortening" (as of 16 May 2022) states, in part, as follows: "URL shortening is a technique on the World Wide Web in which a Uniform Resource Locator (URL) may be made substantially shorter and still direct to the required page. This is achieved by using a redirect which links to the web page that has a long URL. For example, the URL 'https://example.com/assets/category B/subcategory C/Foo/' can be shortened to 'https://example.com/Foo', and the URL 'https://en.wikipedia.org/wiki/URL shortening' can be shortened to 'https://w.wiki/U'. Often the redirect domain name is shorter than the original one. A friendly URL may be desired for messaging technologies that limit the number of characters in a message (for example SMS), for reducing the amount of typing required if the reader is copying a URL from a print source, for making it easier for a person to remember, or for the intention of a permalink . . . . Other uses of URL shortening are to 'beautify' a link, track clicks, or disguise the underlying address."

Published US patent application publication number 2006/0101069 ("Bell") states, in part, as follows: "a method for generating a set of one or more elements of a fingerprint for a document, the document comprising a semantic construct having one or more ordered words, the method comprising the steps of: defining a range of sizes for a fingerprint element; dividing the ordered words of the semantic construct into a set of one or more mutually exclusive fingerprint elements, wherein each of the one or more mutually exclusive fingerprint elements includes a number of adjacent words, the number being within the range of sizes for a fingerprint element; and responsive to a determination that the set of mutually exclusive fingerprint elements excludes a word from the semantic construct, discarding the excluded word. Thus, by defining a range of sizes for a fingerprint and discarding words not included in fingerprint elements the fingerprint for the document reflects only the substantive content of the document since small sections of supplementary content is disregarded. Further, since the fingerprint elements are mutually exclusive, each word in the document appears in only one of the fingerprint elements. The removal of supplementary content and punctuation results in a fingerprint which is smaller than the document itself. Additionally, since the fingerprint is based on the semantic constructs within the document, changes to content within a semantic construct does not affect fingerprint elements corresponding to other semantic constructs. Additionally, mere rearrangement of semantic constructs results in no change to the set of fingerprint elements generated for a document. Thus, only if the substantive content of the document is changed (i.e. the significant words themselves), the fingerprint for the document also changes to a measurable extent corresponding to the change to the substantive content of the document."

SUMMARY

According to an aspect of the present invention, there is a method, computer program product and/or system that performs the following operations (not necessarily in the following order): (i) receiving a uniform resource identifier (URI) associated with an original version of a resource that includes human understandable content; (ii) receiving the resource; (iii) creating a shortened URI; (iv) creating an original synopsis data set including a plurality of attribute values respectively relating to predetermined attributes of the human understandable content of the original version of the resource; (v) subsequent to the creation of the original synopsis data set, receiving a request for the resource, from a requester and over a communication network, that identifies the resource by the shortened URI; (vi) responsive to the receipt of the request: (a) fetching a current version of the resource, and (b) determining that one, or more, of the attribute values of the current version of the resource have changed by more than a threshold amount relative to the attribute values of the original synopsis data set; and (vii) responsive to the determination that the attribute values of the current version of the resource have changed by more than a threshold amount, communicating a notification that the resource has changed to the requester over the communication network.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
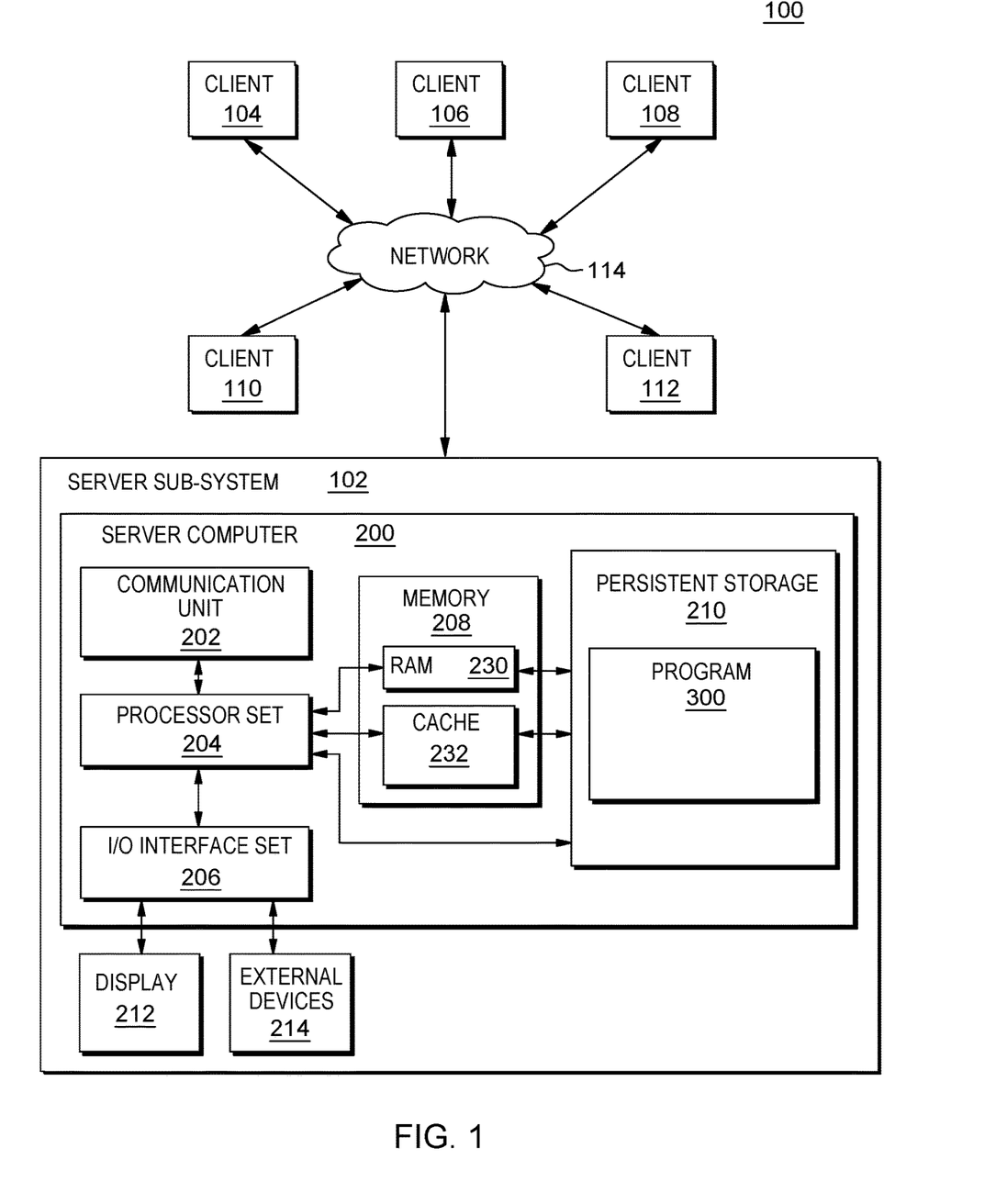
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
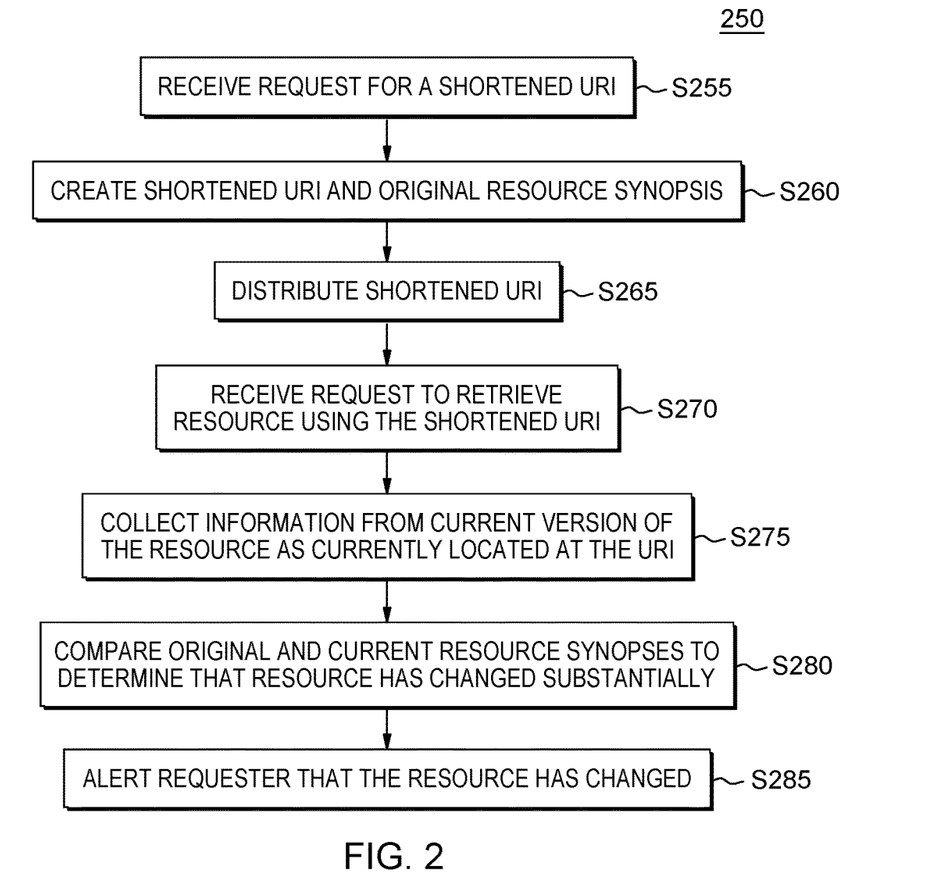
FIG. 2 is a flowchart showing a first embodiment method performed, at least in part, by the first embodiment system.
Figure 3:
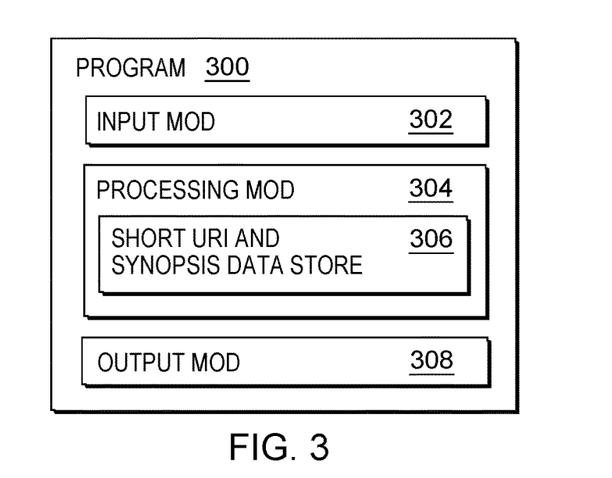
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where input module ("mod") 302 receives a request for a shortened URI from client sub-system 104 through network 114. In this example, the original "resource" is a word processing file having a *.odt format. As will be discussed in the next sub-section, the resource may be another type of resource, such as an HTML (hypertext markup language web page). In this example, the long form URI is a follows:
ldap://[2022:aa1::1]/c=GB?objectClass?one Processing proceeds to operation S260, where processing mod 304 creates a shortened URI, according to URI shortening technology now known or to be developed in the future. In this example, the shortened URI is as follows: abc123

Mod 304 also creates a "synopsis" of the "resource" which contains information about the content (that is, subject matter) of the resource as it would be understood by humans reviewing the content of the resource. The present example will use a highly simplified version of a synopsis so that readers may better understand concepts underlying the present invention. The next sub-section will discuss more complex forms of synopses called "fingerprints." (See the Bell patent publication, quoted in the Background, for some possible methods and conventions for creating certain types of fingerprint style synopses.) Moving back to the simple example of a synopsis, the synopsis in this example is limited to the word with the most occurrences in the text of the document (that is not a common word like "with" or "and"). In this example, the synopsis is limited to the following: the most common word in the content of the resource is "horse" (and variants) and the word occurs 33 times in the word processing document. In this example, the only attributes recorded are as follows: (i) most frequently recited word (attribute value="horse"); and (ii) number of recitations of most frequently recited word (attribute value=33). Other types of synopsis data may be directed at other aspects of the resource, like content of photographs or content of an audio file.

In this example, the form of content that is summarized by the synopsis data is text, but other forms of human understandable content (for example, audio, video and/or still images) can also be scrutinized for changes. Also, while this example is limited to human understandable content of the resource, metadata may additionally be considered when determining the substantiality of change to the resource. For example, the synopsis data set could include a change in the metadata in the form of a change in identity of a listed owner of the resource.

Processing proceeds to operation S265, where the original URI, the shortened URI and the synopsis of the resource is stored in short URI and synopsis data store 306 and also populated to various internet servers by output mod 308, as will be understood by those of skill in the art.

Processing proceeds to operation S270, where input mod 302 receives a request for the resource using the shortened URI from client sub-system 106. In this example, the end user, at client sub-system 106, typed the shortened URI into a search bar in a browser. Alternatively, the end user could use a link to automatically generate a request based on the shortened URI.

Processing proceeds to operation S275, where processing mod 304 retrieves the document at the shortened URI corresponding to the long form URI. In this example, the resource is still an *.odt file, and current synopsis info is collected on this document. The most used word is now "zebra" (and variants), which is used 22 times in the current version of the resource.

Processing proceeds to operation S280, where processing mod 304 compares the original version of the synopsis data, stored in data store 306, with the synopsis data for the current version of the resource as collected and determined at previous operation S275. The synopsis has changed, and, in this example, it has changed in a way so that the end user should be alerted. However, not all synopsis changes would require a warning. For example, consider an alternative example, where "horse" is still the most-frequent-word, but it now occurs 35 times instead of 33—this change is small enough that the end user should not be alerted. The system designer needs to not only define what information is included in the synopses, but related thresholds for the amount and/or types of change in content that need to occur before it becomes expected that an end user would want to be notified that there are changes.

Figure 4:
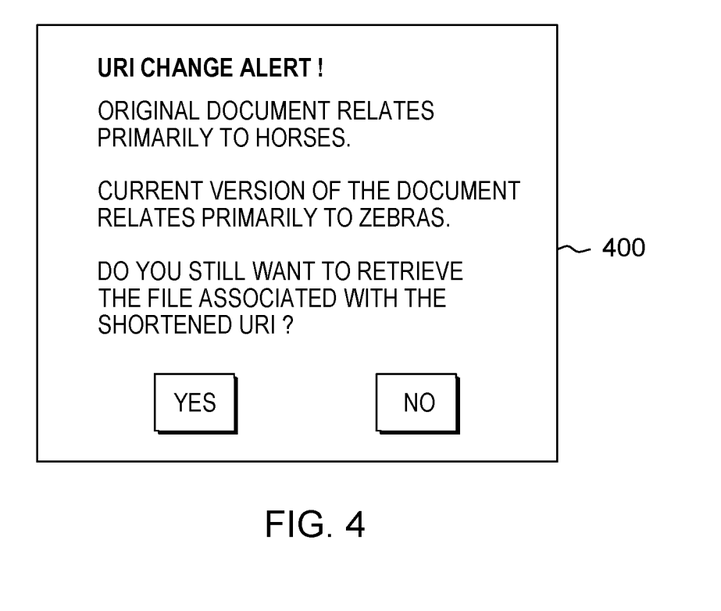
FIG. 4 is a screenshot view generated by the first embodiment system.

Processing proceeds to operation S285, where output mod 308 sends a warning to the requester (that is, end user at client sub-system 106) to alert them that a change in the resource has occurred. In this example, the end user is given a choice of not retrieving the resource because the changes may make it clear that the resource is no longer of interest due to changes in content. This warning is shown at screenshot 400 of FIG. 4.

III. Further Comments and/or Embodiments

Some embodiments of the present invention recognize the following facts, potential problems and/or potential areas for improvement with respect to the current state of the art: (i) a web page contains information about a particular topic, where the link to that web page is often shared with friends or colleagues on the basis of the content within the page; (ii) a web page could be linked to from another reputable page; (iii) over time, the content of a page can change in tone or intent (for example, it could be that it's a wiki page with different editors, or perhaps because the domain ownership has lapsed and a domain squatting company have taken over the domain and altered the contents); and/or (iv) a company can change ownership and retain the domain ownership but alter the content significantly enough to affect the meaning of the content that readers will take from the web page.

Some embodiments of the present invention recognize the following facts, potential problems and/or potential areas for improvement with respect to the current state of the art: (i) it can be particularly dangerous if a page has been recommended as the authority on a subject, and decisions are made based on the page's content and assertions where it can be important to know that a page's content has not changed significantly; (ii) currently, some websites have the ability to track changes (for example, wikis) or to view content at a specific revision level (for example, wikis, version control-based sites that provide internet hosting); (iii) tracking website changes can be used to verify what has changed in a page, since a link was passed across, or to get a link whose contents will never change, (assuming the website is not compromised) which only happens when the user goes to that specific website and the user didn't know in advance that inappropriate changes have been made; (iv) the change log is under the control of the website owner, meaning trust is still required; (v) existing mechanisms only guard against corruption or will fail if minor edits (for example, typos) are fixed; (vi) another option is to use a site that tracks changes (for example, website monitoring software such as visualping.io) and will notify the user if page content changes; (vii) monitoring website changes doesn't fit very well into a workflow where the target user is able to see if the content matches what was sent, where some changes could be irrelevant to the user; (viii) in the HTML (hypertext markup language) spec, it's possible to define a checksum for a specified page content as a <head>tag—this helps to protect against download corruption, but not against potentially malicious page edits; and/or (ix) link fingerprints is an idea that provides the checksum with the URL (uniform resource locator) where this protects against page edits but is unable to discern a minor typo fix from a change of content direction.

A method according to an embodiment of the present invention includes the following operations (not necessarily in the following order): (i) validates page integrity as part of a URL shortening service; (ii) creates a shortened URL of a webpage, by a first user; (iii) calculates a first fingerprint of the shortened webpage, which includes the information about the content, ownership and other parameters; (iv) on opening the shortened URL by a second user, calculates a second fingerprint of the webpage; (v) compares the first and second fingerprints to determine a similarity score; (vi) if the similarity score is above a predetermined threshold, redirects the user to the webpage; and (vii) if the similarity score is below the predetermined threshold, alerts the first and second user that the webpage has changed since the first user had shortened the webpage.

Some embodiments of the present invention may include one, or more, of the following operations, features, characteristics and/or advantages: (i) a user creates a shortened URL to a target web page which is to be shared with other users; (ii) the URL shortening service accesses the target web page, creating a fingerprint of the target web page and storing it in a way that is available for future lookup; (iii) the fingerprint encapsulates the overall content of the web page and some key information around the site's ownership, for instance the WHOIS record and any redirects in place, in a way that is able to be compared for similarity; (iv) another user uses the shortened URL to view the target web page where the URL shortening service accesses the target web page and creates the fingerprint again (v) the URL shortening service compares the original fingerprint to the newly created fingerprint and if the fingerprint matches to within a configured tolerance, the requested web page is returned to the requesting user; and/or (vi) if the fingerprint does not match, an alert is generated in an appropriate manner to notify the user that the web page content has significantly changed since the link was created, and the user can decide whether or not to proceed based on this knowledge.

Some embodiments of the present invention may include one, or more, of the following operations, features, characteristics and/or advantages: (i) the link creator could be notified (for example, via email) and prompted to update the fingerprint and accept the changes as reasonable; (ii) if the link creator is not happy with the changes made then the link can be disabled or edited to point to a different site; (iii) includes a way of providing confidence that the page hasn't changed materially since the link was created; and/or (iv) the URL shortening service provider could, potentially as a valued added service, perform a periodic review of the target website and notify the link creator if it had materially changed since the link was created which would enable the link owner to validate whether they wished to continue to direct people to the modified content or not.

Some embodiments of the present invention may include one, or more, of the following operations, features, characteristics and/or advantages: (i) a fingerprint is created for a web page using an appropriate technology (that is, a broken link checker and updater (BLCU) software for websites, for example Peridot); (ii) allow for immaterial changes to be made by grading the significance of the change to the fingerprint; (iii) BLCU's fingerprints are quite large because they contain significant text chunks from the page content; (iv) to reduce the size of data to be stored, a hash of the fingerprint for a particular page is used; and/or (v) where hashes are generated, a Fuzzy Hashing approach is used which allows for tolerance of minor changes by allowing hashes to be compared to grade the similarity of the contents.

A method according to an embodiment of the present invention includes the following operations (not necessarily in the following order): (i) original user creates shortened URL; (ii) calculate a fingerprint representing the significant text content of the web page; (iii) use a fuzzy hash algorithm to generate hash of the content fingerprint (HASH A); (iv) Hash important WHOIS attributes to represent website owner (HASH B); (v) store WHOIS and BLCU hashes in database against the website URL; and (vi) create shortened URL that redirects to the original URL, store in database against the website URL.

A method according to an embodiment of the present invention includes the following operations (not necessarily in the following order): (i) a shortened URL is passed to the end user; (ii) the end user accesses shortened URL; (iii) the system dereferences the shortened URL to access the original URL; (iv) calculate a fingerprint representing the current significant text content at the original URL; (v) use a fuzzy hash algorithm to generate hash of content fingerprint (HASH A1); (vi) process Hash important WHOIS attributes (HASH B1); (vii) compare hash A with hash A1, and hash B with hash B1; and (viii) take action (such as warning the end user) if hashes do not match to within the configured tolerance, which would indicate that the page has changed significantly.

Some embodiments of the present invention may include one, or more, of the following operations, features, characteristics and/or advantages: (i) includes processing changes over time; (ii) includes alerting to materially changed content over time; (iii) the system process is applied to the overall webpage; and/or (iv) uses fingerprinting to determine changes over time.

Figure 5A:
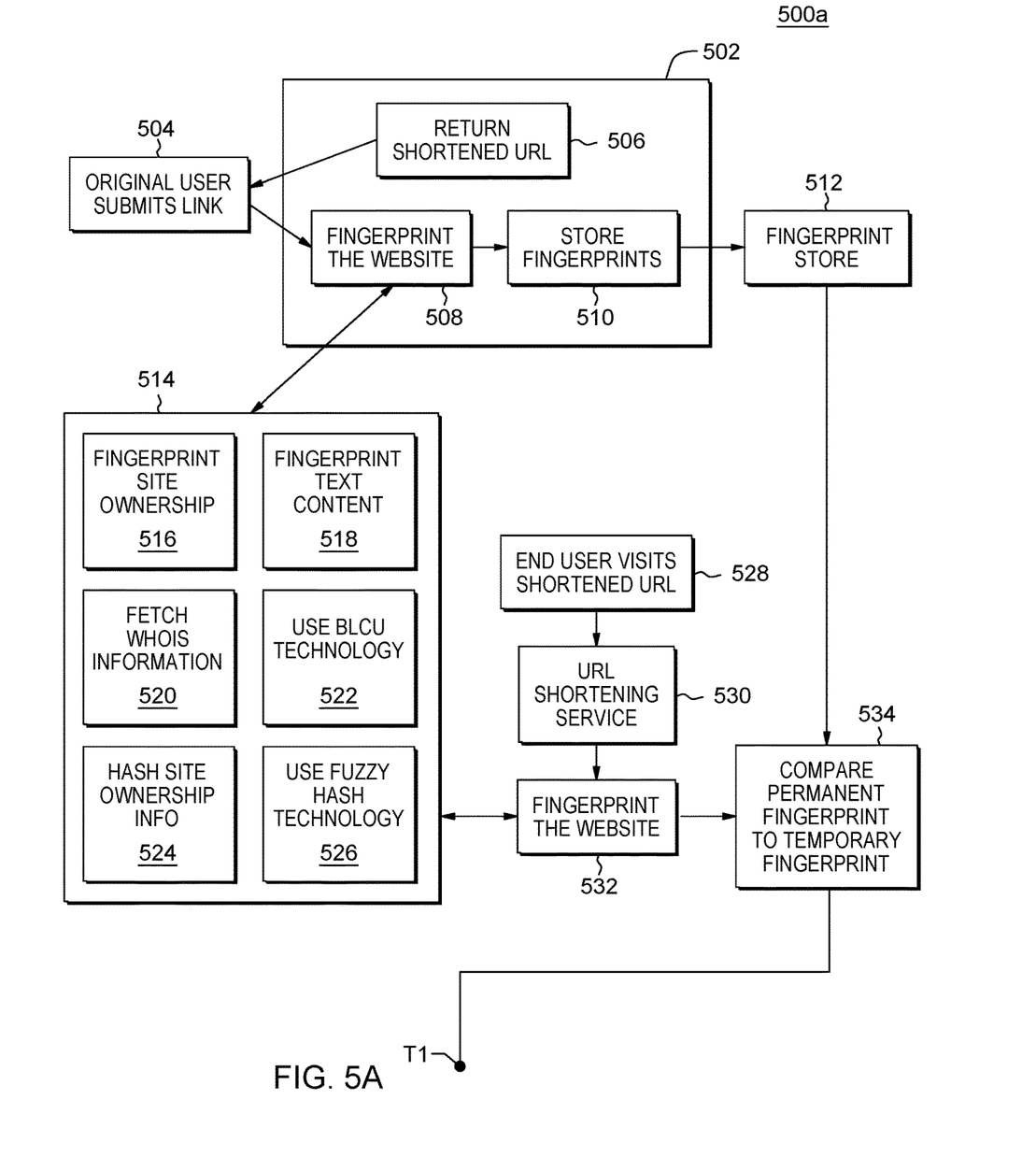
FIGS. 5A and 5B are two portions of a diagram (connected by connection point T1) that is helpful in understanding various embodiments of the present invention.
Figure 5B:
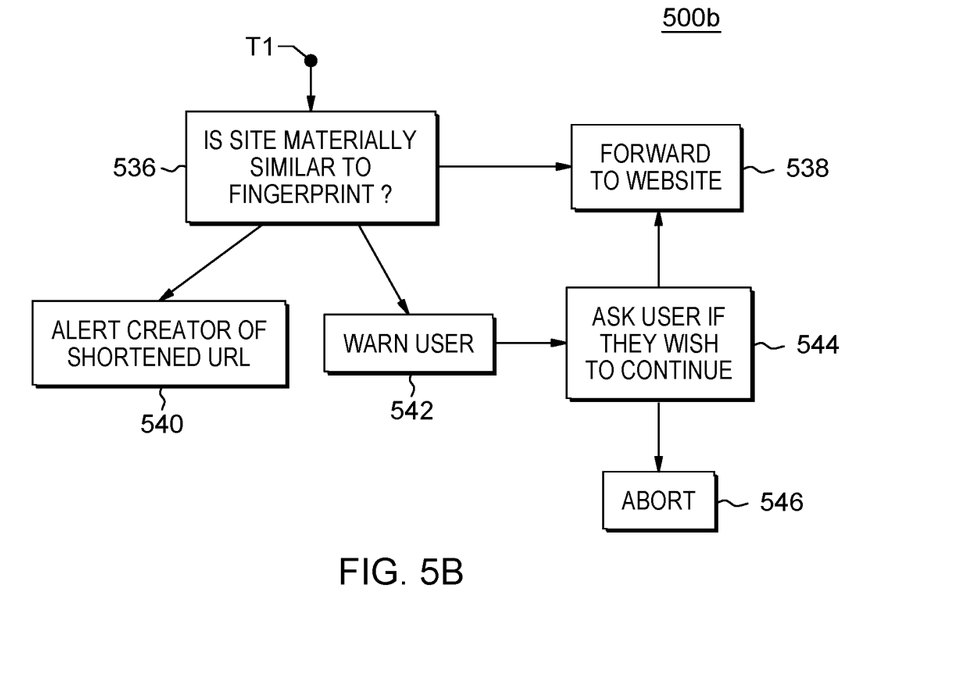

As shown in FIG. 5, diagram 500 includes: URL shortening service (for example, bit.ly) block 502; original user submits link block 504; return shortened URL block 506; fingerprint the website block 508; store fingerprints block 510; fingerprint store block 512; fingerprint website block 514; fingerprint site ownership block 516; fingerprint text content block 518; fetch WHOIS information block 520; use BLCU technology block 522; hash site ownership info block 524; use fuzzy hash technology block 526; end user visits shortened URL block 528; URL shortening service block 530; fingerprint the website block 532; compare permanent fingerprint to temporary fingerprint block 534; is site materially similar to fingerprint? block 536; forward to website block 538; alert creator of shortened URL block 540; warn user block 542; ask user if they wish to continue block 544; and abort block 546.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a uniform resource identifier (URI) associated with an original version of a resource that includes human understandable content;
receiving the resource;
creating a shortened URI;
creating an original synopsis data set including a plurality of attribute values respectively relating to predetermined attributes of the human understandable content of the original version of the resource;
subsequent to creating the original synopsis data set, receiving a request for the resource, from a requester and over a communication network, that identifies the resource by the shortened URI;
responsive to receiving the request for the resource:
fetching a current version of the resource, and
determining that one, or more, of the attribute values of the current version of the resource have changed by more than a threshold amount relative to the attribute values of the original synopsis data set; and
responsive to the determination that the attribute values of the current version of the resource have changed by more than a threshold amount, communicating a notification that the resource has changed to the requester over the communication network.

2. The CIM of claim 1 further comprising:
responsive to the communication of the notification, receiving a communication from the requester indicating that the resource should not be retrieved.

3. The CIM of claim 1 further comprising:
responsive to the communication of the notification, receiving a communication from the requester indicating that the resource should be retrieved; and
sending the resource to the requester.

4. The CIM of claim 1 wherein:
the resource is a web page; and
the URI and the shortened URI are in a form of URLs.

5. The CIM of claim 1 wherein the human understandable content includes at least one of the following forms of content: text, video, audio and still image(s).

6. The CIM of claim 1 wherein the synopsis data set also includes a change in a metadata in a form of a change in identity of a listed owner of the resource.

7. A computer program product (CPP) comprising:
a set of storage device(s); and
computer code stored collectively in the set of storage device(s), with the computer code including data and instructions to cause a processor(s) set to perform at least the following operations:
receiving a uniform resource identifier (URI) associated with an original version of a resource that includes human understandable content,
receiving the resource,
creating a shortened URI,
creating an original synopsis data set including a plurality of attribute values respectively relating to predetermined attributes of the human understandable content of the original version of the resource,
subsequent to creating the original synopsis data set, receiving a request for the resource, from a requester and over a communication network, that identifies the resource by the shortened URI,
responsive to receiving the request for the resource:
fetching a current version of the resource, and
determining that one, or more, of the attribute values of the current version of the resource have changed by more than a threshold amount relative to the attribute values of the original synopsis data set; and
responsive to the determination that the attribute values of the current version of the resource have changed by more than a threshold amount, communicating a notification that the resource has changed to the requester over the communication network.

8. The CPP of claim 7 wherein the computer code further includes instructions for causing the processor(s) set to perform the following operation(s):
responsive to the communication of the notification, receiving a communication from the requester indicating that the resource should not be retrieved.

9. The CPP of claim 7 wherein the computer code further includes instructions for causing the processor(s) set to perform the following operation(s):
responsive to the communication of the notification, receiving a communication from the requester indicating that the resource should be retrieved; and
sending the resource to the requester.

10. The CPP of claim 7 wherein:
the resource is a web page; and
the URI and the shortened URI are in a form of URLs.

11. The CPP of claim 7 wherein the human understandable content includes at least one of the following forms of content: text, video, audio and still image(s).

12. The CPP of claim 7 wherein the synopsis data set also includes a change in a metadata in a form of a change in identity of a listed owner of the resource.

13. A computer system (CS) comprising:
a processor(s) set;
a set of storage device(s); and
computer code stored collectively in the set of storage device(s), with the computer code including data and instructions to cause the processor(s) set to perform at least the following operations:
receiving a uniform resource identifier (URI) associated with an original version of a resource that includes human understandable content,
receiving the resource,
creating a shortened URI,
creating an original synopsis data set including a plurality of attribute values respectively relating to predetermined attributes of the human understandable content of the original version of the resource,
subsequent to creating the original synopsis data set, receiving a request for the resource, from a requester and over a communication network, that identifies the resource by the shortened URI,
responsive to receiving the request for the resource:
fetching a current version of the resource, and
determining that one, or more, of the attribute values of the current version of the resource have changed by more than a threshold amount relative to the attribute values of the original synopsis data set; and
responsive to the determination that the attribute values of the current version of the resource have changed by more than a threshold amount, communicating a notification that the resource has changed to the requester over the communication network.

14. The CS of claim 13 wherein the computer code further includes instructions for causing the processor(s) set to perform the following operation(s):
responsive to the communication of the notification, receiving a communication from the requester indicating that the resource should not be retrieved.

15. The CS of claim 13 wherein the computer code further includes instructions for causing the processor(s) set to perform the following operation(s):
responsive to the communication of the notification, receiving a communication from the requester indicating that the resource should be retrieved; and
sending the resource to the requester.

16. The CS of claim 13 wherein:
the resource is a web page; and
the URI and the shortened URI are in a form of URLs.

17. The CS of claim 13 wherein the human understandable content includes at least one of the following forms of content: text, video, audio and still image(s).

18. The CS of claim 13 wherein the synopsis data set also includes a change in a metadata in a form of a change in identity of a listed owner of the resource.

19. The CS of claim 13 wherein:
the resource is a web page; and
the URI and the shortened URI are in a form of URLs; and
the human understandable content includes at least one of the following forms of content: text, video, audio and still image(s).

20. The CS of claim 13 wherein:
the resource is a web page;
the URI and the shortened URI are in a form of URLs;
the human understandable content includes at least one of the following forms of content: text, video, audio and still image(s); and
the synopsis data set also includes a change in a metadata in a form of a change in identity of a listed owner of the resource.

\* \* \* \* \*